(12) United States Patent
Ptasinski et al.

(10) Patent No.: US 7,457,501 B1
(45) Date of Patent: Nov. 25, 2008

(54) ELECTROMAGNETIC ENERGY COUPLER

(75) Inventors: Joanna N. Ptasinski, San Diego, CA (US); J. Scott Rodgers, San Diego, CA (US); Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 106 days.

(21) Appl. No.: 11/586,746

(22) Filed: Oct. 16, 2006

(51) Int. Cl.
*G02B 6/10* (2006.01)
*G02B 6/24* (2006.01)
*G02B 6/125* (2006.01)

(52) U.S. Cl. .......................... 385/129; 385/31; 385/50

(58) Field of Classification Search ............... 333/24 R; 385/30, 31, 39, 50
See application file for complete search history.

(56) References Cited

U.S. PATENT DOCUMENTS

| | | | |
|---|---|---|---|
| 6,366,392 | B1 | 4/2002 | Tokushima |
| 6,574,383 | B1 | 6/2003 | Erchak et al. |
| 6,631,236 | B2 | 10/2003 | Yamada |
| 6,707,588 | B2 | 3/2004 | Takada |
| 6,768,256 | B1 | 7/2004 | Fleming et al. |
| 6,778,562 | B2 | 8/2004 | Bayart et al. |
| 6,782,169 | B2 | 8/2004 | Shi et al. |
| 6,786,968 | B2 | 9/2004 | Theil |
| 6,825,982 | B1 | 11/2004 | Ting |
| 7,245,808 | B2 * | 7/2007 | Sato et al. .................... 385/129 |

OTHER PUBLICATIONS

H.J. Lezec, A. Degiron, E. Devaux, R.A. Linke, L. Martin-Moreno, F'J. Garcia-Vidal, T.W. Ebbesen: "Beaming Light from a Subwavelenght Aperature"; Science Aug. 2, 2002 vol. 297 pp. 820-822 USA.

* cited by examiner

*Primary Examiner*—Dean O Takaoka
(74) *Attorney, Agent, or Firm*—Kyle Eppele; Peter A. Lipovsky; Ryan J. Friedl

(57) ABSTRACT

A technique for coupling electromagnetic energy into an aperture smaller than the wavelength of the electromagnetic energy desired to be coupled is disclosed.

20 Claims, 6 Drawing Sheets

FIG.4
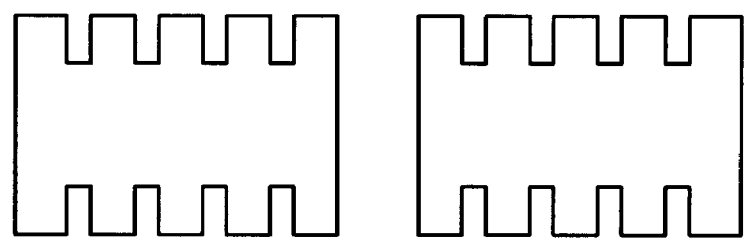
(A)
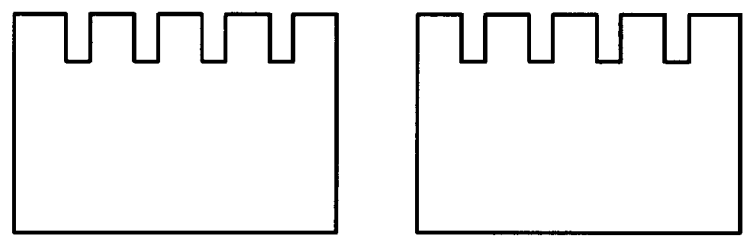
(B)

ELECTROMAGNETIC ENERGY COUPLER

BACKGROUND

The following description relates to coupling electromagnetic energy into an opening smaller than the wavelength of the electromagnetic energy desired to be coupled.

Photons are expected to replace electrons in future all-optical devices as described in R. Biswas, M. M. Sigalas, K.-M. Ho and S.-Y. Lin, *Physical Review B*, Volume 65, page 205121, 20 May 2002.

Photonic crystals are optical devices that have become attractive due to their ability to control the propagation of light on a very small length scale. However, the small size of photonic crystals also poses one of the greatest challenges of employing them, such as finding an efficient way of coupling light into these ultra-small structures, as described in N. Moll and G.-L. Bona, *Journal of Applied Physics*, Volume 93, Number 9, page 4986, 1 May 2003. A fundamental constraint in manipulating light and coupling it into photonic crystals has to do with the extremely low transmission of light through apertures smaller than the wavelength of the incident photon. This limitation is known as the diffraction limit $d=1.22\lambda/a$, wherein "$\lambda$" is the wavelength of the light and "$a$" is a maximum dimension of the aperture.

SUMMARY

A technique for coupling electromagnetic energy into an aperture smaller than the wavelength of the electromagnetic energy desired to be coupled is disclosed.

Other objects, advantages and new features will become apparent from the following detailed description when considered in conjunction with the accompanied drawings.

BRIEF DESCRIPTION OF THE DRAWINGS

FIGS. 4A and 4B are side cross-sectional views of example electromagnetic energy couplers having, respectively, input and output corrugations, and solely input corrugations.

DESCRIPTION

Figure 1:
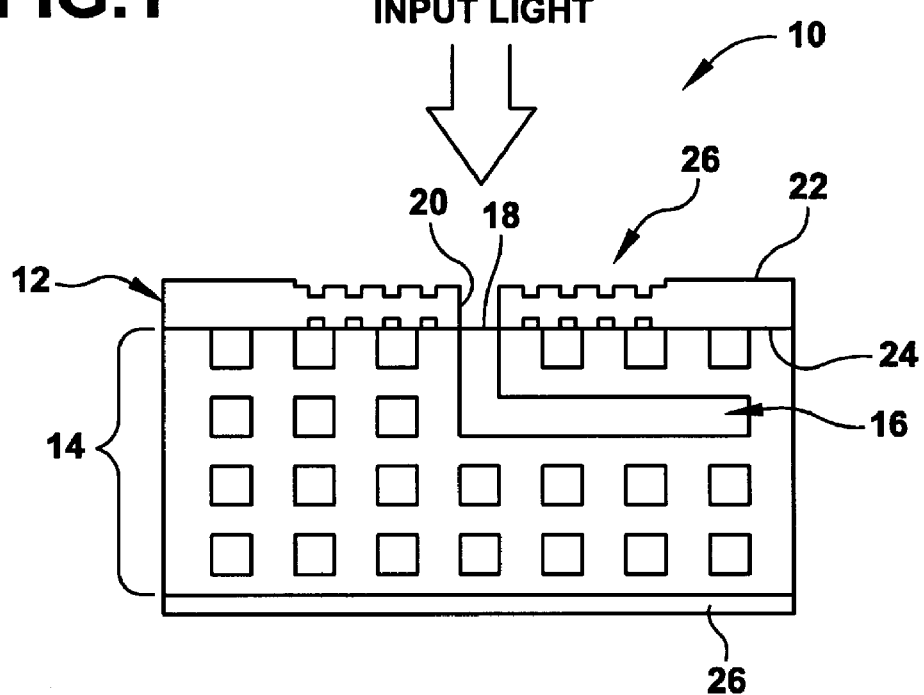
FIG. 1 shows a side view of a representative electromagnetic energy coupler disposed on a photonic crystal structure.

Referring to FIG. 1, an exemplary electromagnetic energy coupler apparatus, the surface plasmon polariton photonic crystal coupler apparatus 10 is shown. Coupler apparatus 10 includes an electromagnetic energy coupler 12 that is operably coupled to a photonic crystal structure 14. Defined within photonic crystal is a waveguide 16 that in turn defines an opening 18 in a side of the photonic crystal structure. The photonic crystal in this instance is shown to be multidimensional, however photonic crystals of one as well as two and three dimensions are usable with the coupler described herein.

Electromagnetic energy coupler 12 creates a surface plasmon polariton layer from which surface plasmon polariton surface waves are launched. Coupler 12 defines an aperture 20 that is disposed in alignment with opening 18 of waveguide 16. As can be seen in the figure, electromagnetic energy coupler 12 has oppositely disposed input side 22 and output side 24 wherein aperture 20 extends between these sides. Input side 22 is distal to crystal 14. The cross-sectional view of the example coupler apparatus of FIG. 1 depicts corrugations, shown generally at 26, in the input and output sides that surround and are concentric (share a common center) with aperture 20, as will be described in greater detail. As can also be seen in this figure, a substrate 26 may be located on one side of the crystal structure 14.

Figure 2:
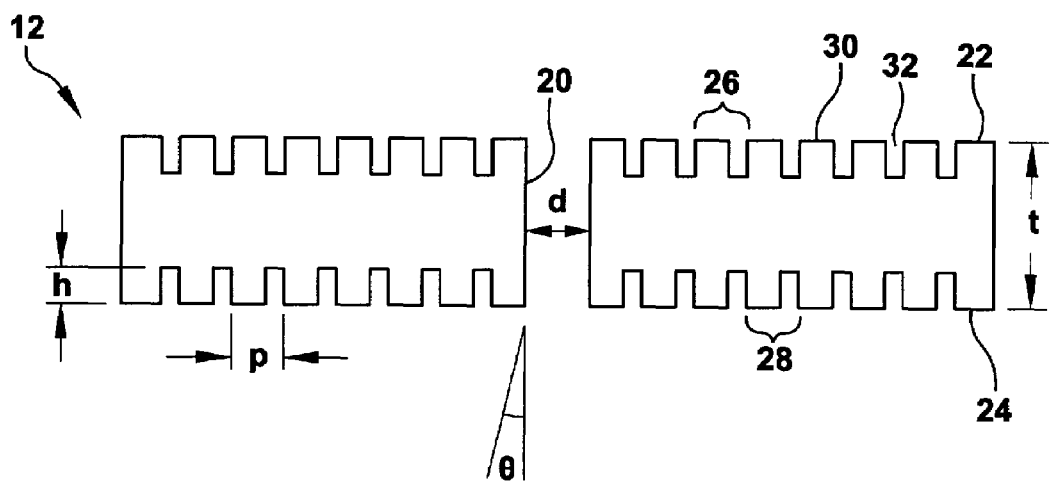
FIG. 2 depicts a side, cross-sectional, view of an example electromagnetic energy coupler according to the description herein wherein dimensional descriptors are inserted.

Referring now to FIG. 2, a side, cross-sectional, view of an example electromagnetic energy coupler 12 is shown in greater detail. Electromagnetic energy coupler 12 is a conductor, and may be a single layer composed of, for example, Ag, Au, Cr, Al, Ni or other metals or alloys thereof or conductive organic or inorganic materials, or may be metallic multilayers or conductive stacks.

The plasma frequency of this conductive material is much greater than the frequency of the incoming electromagnetic energy desired to be coupled, thereby satisfying the Drude formalism wherein the frequency dependent dielectric constant of a the conductive material can be written as:

$$\varepsilon(\omega) = 1 - \frac{\omega_p^2}{\omega(\omega + i\gamma)}$$

where $\omega$ is the frequency, $\omega_p$ is the plasma frequency, and $\bar{\gamma}$ is the absorption. To satisfy the Drude formalism, $\text{Re}[\varepsilon(\omega)]$ must be negative, which excites surface plasmons at the conductor-dielectric interface.

In this example embodiment, corrugations 26 are shown at input side 22 of the coupler 12 as well as corrugations 28 at output side 24 of the coupler. These corrugations are shown to be spaced periodically, having period "P", and the corrugations on the input and output surfaces of coupler 12 are illustrated in this example to be substantially equal (comparing side versus side) and are oppositely disposed. On both sides, the corrugations have ridges 30 and grooves 32 of unequal cross-section and of substantially square corners. Suitably chosen corrugations that are aperiodic, as well as corrugations that are dissimilar when comparing those of input side 22 to those of output side 24, may also be used for coupling where considered desirable.

The input side corrugations 26 affect the capturing and eventual coupling of electromagnetic energy into an accompanying photonic crystal or other device. The size of the corrugations on the output side of the coupler affect the divergence angle (theta) of the coupled beam. Having top and bottom corrugations that are substantially similar results in a coupled beam that is relatively collimated, for example a divergence angle found to be less than 3 degrees. If a less collimated output beam is desired, then one may choose to use no corrugations on the output side of the coupler, thereby enabling the coupled energy to spread out (generally into a half-sphere-like formation). Alternatively, for an embodiment of the electromagnetic energy coupler wherein output side corrugations are used, altering the output side corrugations should permit an altering of the "spread" of the coupled exit beam. In such an instance, the overall period of the output side corrugations can be chosen to remain the same, but the ratio of ridge to groove cross-sections is altered. In either case, the size of the corrugations are chosen to correspond to the wavelength of the electromagnetic energy desired to be coupled.

The following describes an example specifications for coupling light energy into a photonic crystal, or other photonic device. In this example, an incident photon wavelength at 1.5 μm is coupled through coupler 12 having a maximum dimension (d) of the aperture that is less than or equal to 625 nm. The thickness (t) of electromagnetic energy coupler 12 is approximately 300 nm though this thickness can fall within a range from about 100 nm to about 500 nm. Surrounding the aperture and formed within coupler 12 are corrugations concentric to the aperture. Each corrugation has a ridge height (h) of 75 nm, though this dimension can fall within a range of about 50 nm to about 100 nm and has a width of approximately 600 nm though this width dimension can fall within a range of about 500 nm to about 700 nm. The period (P) of the concentric corrugations is 1.25 μm. Coupling is achievable with 7-10 periods of corrugations.

Figure 3:
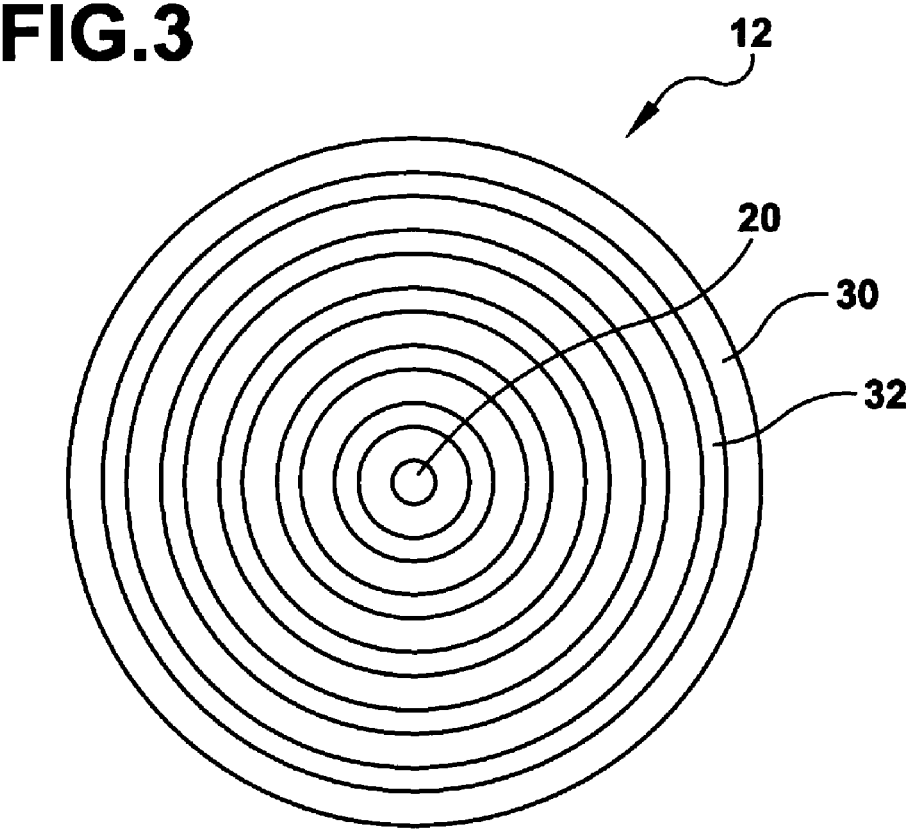
FIG. 3 shows a top view of an exemplary electromagnetic energy coupler depicting an aperture surrounded by corrugations of ridges and grooves.

FIG. 3 is a top view of an example electromagnetic energy coupler wherein the coupler is shown with a circular aperture 20 and concentric corrugations that include ridges 30 and grooves 32. Though a circular aperture is shown in this figure and is surrounded by concentric circular corrugations, other shaped apertures can also be accommodated by the electromagnetic coupler described herein. For example, a rectangular aperture can be used and be surrounded by periodically spaced, rectangular-shaped corrugations.

FIGS. 4A and 4B show cross-sectional views of electromagnetic energy coupler 12 in two embodiments of corrugation usage. FIG. 4A illustrates the use of input side and output side corrugations and FIG. 4B shows use of solely input side corrugations.

Figure 5:
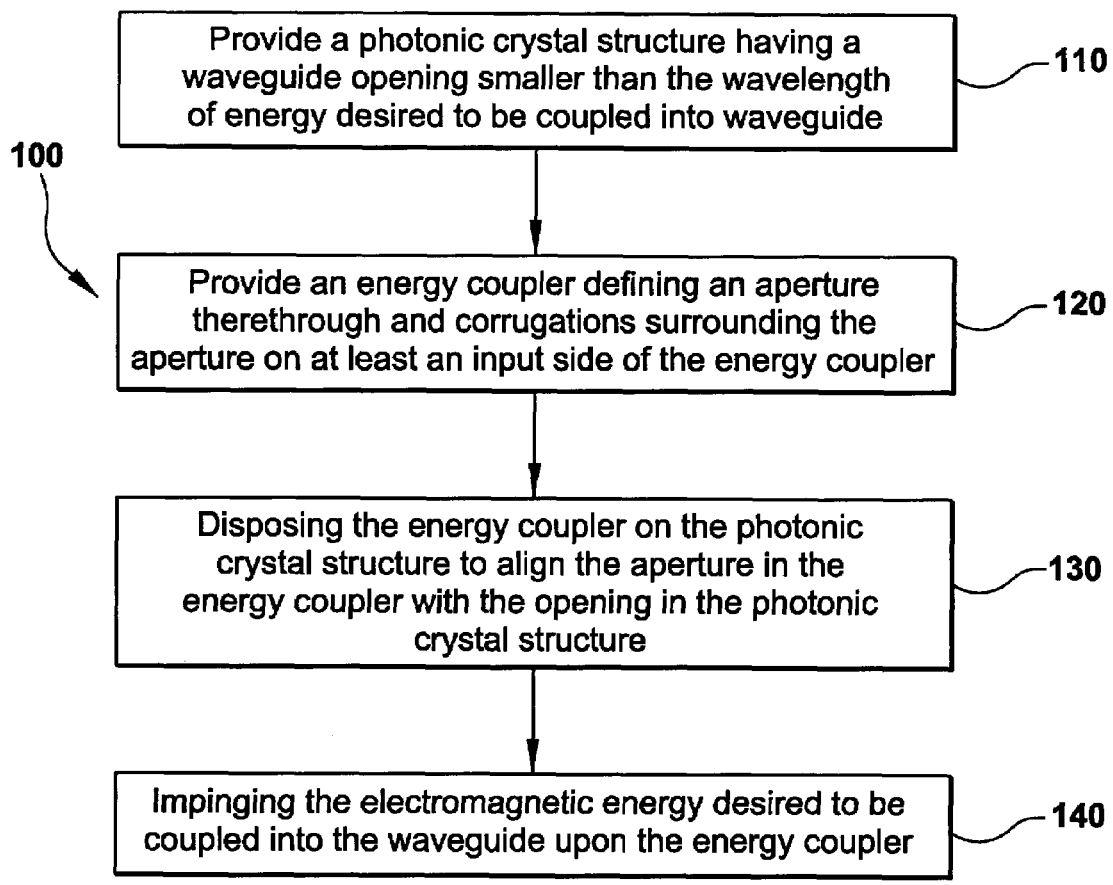
FIG. 5 shows an example method in accordance with the description herein.
Figure 6A:
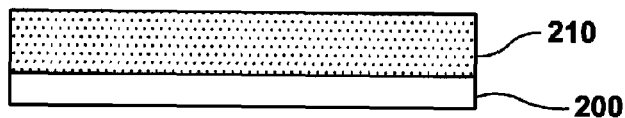
FIG. 6 shows example processing steps in accordance with the description herein.
Figure 6B:
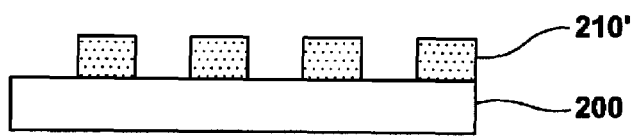
Figure 6C:
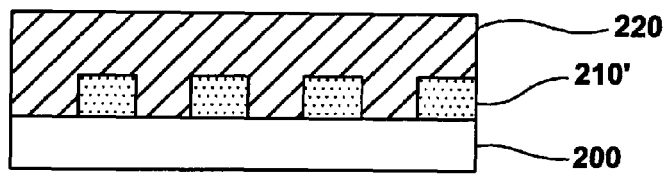
Figure 6D:
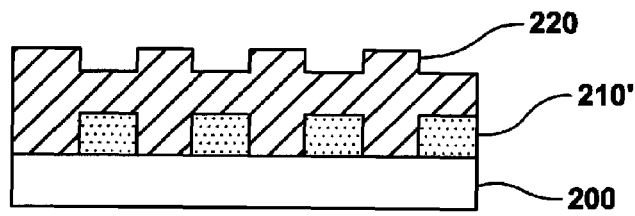
Figure 6E:
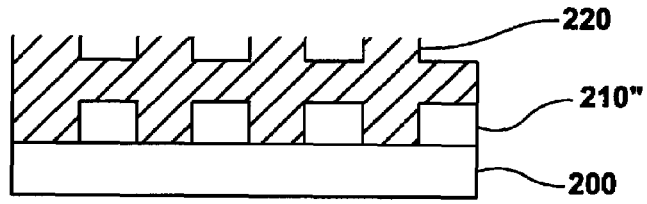

FIG. 5 shows a representative method 300 of coupling electromagnetic energy into a photonic crystal. Method 100 includes:

at step 110 providing a photonic crystal structure wherein the photonic crystal structure defines a waveguide therein that has an opening at a side of said photonic crystal structure, wherein the opening has a maximum dimension that is smaller than any wavelength of electromagnetic energy desired to be coupled into the waveguide;

at step 120 providing an electromagnetic energy coupler defining an aperture therethrough and having input and output oppositely disposed sides wherein at least the input side has corrugations surrounding the aperture;

at step 130 disposing the electromagnetic energy coupler on the photonic crystal so that the output side of the electromagnetic energy coupler is adjacent the photonic crystal and so that the aperture of the electromagnetic energy coupler is aligned with the opening in the photonic crystal structure; and at step 140 impinging the electromagnetic energy desired to be coupled into the waveguide upon the electromagnetic energy coupler.

The electromagnetic energy coupler may be first fabricated and then operably disposed upon a photonic crystal using, for example, diffusion bonding, anodic bonding and the like.

Alternately, it may be integrally formed directly to a photonic crystal structure. For example, the electromagnetic energy coupler disclosed herein may be fabricated by deposition of a conductive layer onto a photonic crystal. Deposition techniques usable for this include, but are not limited to, evaporation, e-beam sputtering, and laser ablation of a suitable target. A focused-ion-beam system may then be used to mill an aperture surrounded by corrugation grooves in the conductive layer.

Alternatively, the electromagnetic energy coupler may be patterned on a photonic crystal layer using photolithographic masking and plasma etching, wet chemical etching or reactive ion etching techniques. Alternately, a sacrificial layer may be deposited and patterned prior to the formation of the conductive coupler in order to form a non-planar surface on the output side of the coupler. This sacrificial layer may comprise silicon dioxide, silicon nitride, aluminum oxide, and polyimides. For example, a sacrificial silicon dioxide layer may be deposited onto the photonic crystal structure, and be patterned using photolithographic masking and plasma etching techniques practiced in the art of micro-fabrication. The sacrificial silicon dioxide layer has the property of forming a temporary physical structure to support later material depositions and it may be removed later by etching in an etching solution (for example a 10:1 mixture of hydrofluoric acid and water) without affecting adjacent structures, thereby revealing the desired final structure.

Referring to FIG. 6, example processing steps as may be used to arrive at an exemplary electromagnetic energy coupler apparatus are shown. In this figure, a photonic crystal structure 200 is first provided by any techniques as practiced in the art. Silicon dioxide layer 210 is formed on photonic crystal structure 200 by bonding or deposition techniques, for example, as depicted in FIG. 6A. Silicon dioxide layer 200 is patterned using photolithographic masking and etching techniques to form sacrificial silicon dioxide layer 210'. Etching of the sacrificial silicon dioxide layer 210' using plasma etching, reactive ion etching, ion milling or wet chemical etching produces an exemplary structure depicted in FIG. 6B. FIG. 6C depicts the forming of a metal layer 220 on the sacrificial silicon dioxide layer 220 and photonic crystal structure 200. Forming metal layer 220 may use deposition techniques such as evaporation, e-beam sputtering, and laser ablation of a suitable target. Metal layer 220 is patterned using photolithographic masking and etching techniques. Etching of the metal layer 220 using plasma etching, reactive ion etching, ion milling or wet chemical etching produces an exemplary structure depicted in FIG. 6D. Sacrificial silicon dioxide layer 210' may be removed by etching in an etching solution (for example a 10:1 mixture of hydrofluoric acid and water) forming voids 210" without effecting adjacent structures thereby revealing the end-result apparatus depicted in FIG. 6E.

Obviously, many modifications and variations are possible in light of the above description. It is therefore to be understood that within the scope of the claims, the invention may be practiced otherwise than as has been specifically described.

What is claimed is:

1. An apparatus comprising:
    a photonic crystal structure, said photonic crystal structure defining a waveguide therein that has an opening at a side of said photonic crystal structure; and
    an electromagnetic energy coupler directly coupled to said photonic crystal structure, said electromagnetic energy coupler having oppositely disposed input and output sides and defining an aperture from said input to said output side that is disposed in alignment with said opening in said photonic crystal structure, said input side of said electromagnetic energy coupler being distal to said photonic crystal structure and having corrugations therein surrounding said aperture in said electromagnetic energy coupler.

2. The apparatus of claim 1 wherein said opening has a maximum dimension that is smaller than any wavelength of electromagnetic energy desired to be coupled into said waveguide.

3. The apparatus of claim 1 wherein said output side of said electromagnetic energy coupler has corrugations surrounding said aperture.

4. The apparatus of claim 3 wherein said opening has a maximum dimension that is smaller than any wavelength of electromagnetic energy desired to be coupled into said waveguide.

5. The apparatus of claim 3 wherein said corrugations are concentric with said opening.

6. The apparatus of claim 5 wherein said opening is substantially round.

7. The apparatus of claim 5 wherein said corrugations are spaced periodically.

8. The apparatus of claim 1 wherein said corrugations in said input surface have substantially square corners.

9. The apparatus of claim 8 wherein said corrugations have ridges and furrows of unequal cross-section.

10. The apparatus of claim 3 wherein said corrugations of said input and output surfaces have substantially square corners.

11. The apparatus of claim 10 wherein said corrugations have ridges and furrows of unequal cross-section.

12. The apparatus of claim 10 wherein said corrugations of said input and output surfaces are substantially equal and are oppositely disposed.

13. The apparatus of claim 7 wherein said periodically spaced corrugations have a period that corresponds to a wavelength of electromagnetic energy desired to be coupled into said waveguide.

14. A method comprising the steps of:
providing a photonic crystal structure, said photonic crystal structure defining a waveguide therein that has an opening at a side of said photonic crystal structure, said opening having a maximum dimension that is smaller than any wavelength of electromagnetic energy desired to be coupled into said waveguide;
providing an electromagnetic energy coupler defining an aperture therethrough and having input and output oppositely disposed sides wherein said input side has corrugations surrounding said aperture;
disposing said electromagnetic energy coupler directly on said photonic crystal so that said output side of said electromagnetic energy coupler is adjacent said photonic crystal and so that said aperture of said electromagnetic energy coupler is aligned with said opening in said photonic crystal structure; and
impinging said electromagnetic energy desired to be coupled into said waveguide upon said electromagnetic energy coupler.

15. An electromagnetic energy coupler apparatus comprising:
oppositely disposed input and output sides and defining an aperture from said input to said output side that is disposed in alignment with a photonic device, said input side of said electromagnetic energy coupler being distal to said photonic device and having corrugations therein surrounding said aperture in said electromagnetic energy coupler, wherein said electromagnetic energy coupler is directly coupled to a photonic crystal structure.

16. The apparatus of claim 15 wherein said aperture is operably aligned with an opening in said photonic device, said opening having a maximum dimension that is smaller than any wavelength of electromagnetic energy desired to be coupled into said photonic device.

17. A method comprising the steps of:
providing a photonic device, said photonic device having an opening at a side of said photonic device, said opening having a maximum dimension that is smaller than any wavelength of electromagnetic energy desired to be coupled into said device;
providing an electromagnetic energy coupler defining an aperture therethrough and having input and output oppositely disposed sides wherein said input side has corrugations surrounding said aperture;
disposing said electromagnetic energy coupler on said photonic device so that said output side of said electromagnetic energy coupler is directly on said photonic device and so that said aperture of said electromagnetic energy coupler is aligned with said opening in said photonic device; and
impinging said electromagnetic energy desired to be coupled into said waveguide upon said electromagnetic energy coupler.

18. The apparatus of claim 1, wherein the photonic crystal structure is three-dimensional.

19. The apparatus of claim 1, wherein the electromagnetic energy coupler contains between seven and ten corrugations.

20. The apparatus of claim 3, wherein the corrugations on the input side of the electromagnetic energy coupler and the corrugations on the output side of the electromagnetic energy coupler are aligned.

* * * * *